United States Patent [19]

Johnson et al.

[11] Patent Number: 4,712,228
[45] Date of Patent: Dec. 8, 1987

[54] DAYLIGHT X-RAY CASSETTE HAVING A WEIGHT TO IMPROVE FILM RELEASE

[75] Inventors: Van B. Johnson, Towanda; Salvatore J. Nicosia, Athens, both of Pa.

[73] Assignee: E. I. Du Pont de Nemours and Company, Wilmington, Del.

[21] Appl. No.: 850,601

[22] Filed: Apr. 8, 1986

[51] Int. Cl.$^4$ .............................................. G03B 42/04
[52] U.S. Cl. ..................................... 378/185; 378/182
[58] Field of Search ...................... 378/169, 172–173, 378/182–188, 176, 181

[56] References Cited

U.S. PATENT DOCUMENTS

| Re. 28,438 | 6/1975 | Schmidt | 206/455 |
|---|---|---|---|
| 3,048,696 | 8/1962 | Koerner et al. | 378/176 |
| 3,286,092 | 11/1966 | Sames | 378/187 |
| 3,715,087 | 2/1973 | Schmidt | 242/67.3 |
| 3,784,835 | 1/1974 | Schmidt | 378/187 |
| 3,826,922 | 7/1974 | Ingles | 378/181 |
| 3,842,282 | 10/1974 | Shimoda et al. | 378/188 |
| 3,870,889 | 3/1975 | Schmidt | 378/187 |
| 3,934,735 | 1/1976 | Schmidt | 378/182 |
| 4,383,330 | 5/1983 | De Felice et al. | 378/187 |
| 4,444,484 | 4/1984 | Best et al. | 378/182 |
| 4,539,696 | 9/1985 | Walling et al. | 378/181 |
| 4,613,984 | 9/1986 | Fisher | 378/185 |

Primary Examiner—Craig E. Church
Assistant Examiner—John C. Freeman

[57] ABSTRACT

A weight is moveably positioned in the side opposite the side having a film entrance slot of a side opening x-ray cassette. When the plates holding the film are separated the weight acting under the influence of gravity aids in ejecting the film from the cassette.

10 Claims, 5 Drawing Figures

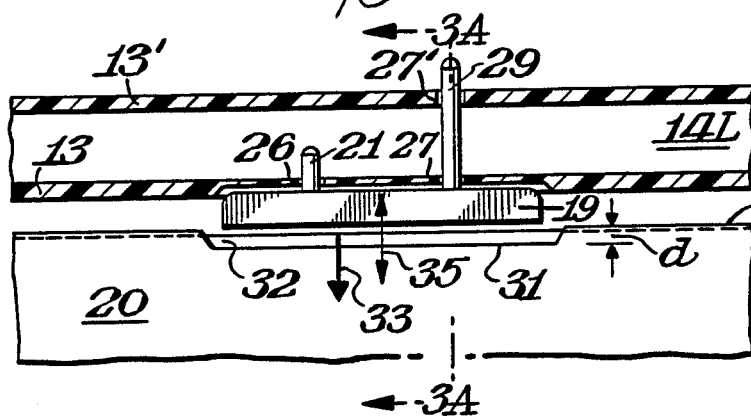
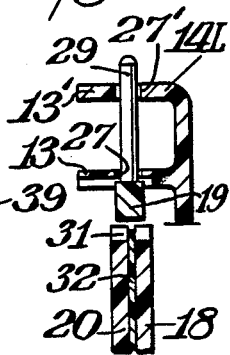
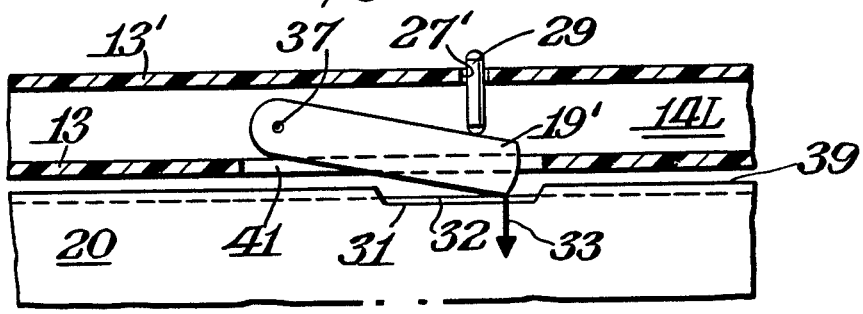

DAYLIGHT X-RAY CASSETTE HAVING A WEIGHT TO IMPROVE FILM RELEASE

DESCRIPTION

1. TECHNICAL FIELD

This invention relates to an x-ray cassette. More particularly this invention relates to a daylight x-ray cassette having means for applying a force to a film sheet placed between two substantially flat plates to assist in releasing the film sheet from therebetween.

2. BACKGROUND OF THE INVENTION

In the development of x-ray film handling systems, equipment has been provided which allows the automatic loading and unloading of x-ray film into and from a cassette under daylight conditions. Such equipment frees the operator from the need to load and unload the film into and from a cassette in a dark room. Exemplary of such an automatic system is that disclosed in Schmidt U.S. Pat. No. Re. 28,438. This reissue patent describes an x-ray film package for use with the daylight loading cassette of the type disclosed in Schmidt U.S. Pat. Nos. 3,784,835 and 3,870,889. Schmidt 3,715,087 describes a device used for unloading cassettes described in the last mentioned patents under daylight conditions.

In the operation of these x-ray film handling systems, a film sheet is automatically loaded into the cassette which is operative to hold the film between two opposed substantially parallel x-ray intensifying screens during a period of patient exposure. Following exposure, the cassette is unloaded under the influence of gravity using a device as disclosed in the last mentioned patent. This device is adapted to release one of the two cassette plates supporting the intensifying screens to thereby relieve the holding pressure from the film sheet and allow it to drop under the influence of gravity into a light-tight container.

In designing and constructing x-ray cassettes, an important consideration is contact between a film sheet and the intensifying screens. Not only should such contact be intimate, but it should be uniform over the full area of the intensifying screens. One of the problems encountered as the x-ray cassettes are made larger, is that as the two intensifying screens are brought into contact with the film sheet placed therebetween, air is trapped between the screen and the film thereby reducing contact and resulting in a radiographic image of poorer resolution. The problem is particularly significant when high resolution smooth surface screens are used. A method to improve the contact between the screen and the film is described in a pending U.S. application Ser. No. 767,334 filed Aug. 21, 1985, and assigned to the assignee of this application. However, when the solution to this problem is successful, the absence of air between the intensifying screen and the film sheet creates attractive forces which tend to delay the release or dropping of the film when the intensifying screens are separated.

For a variety of reasons it is important that the time required for the film to drop from the cassette be maintained to within a reasonable maximum on the order of approximately 7 seconds and preferably of the order of 2-3 seconds. It is also desirable that the variability in the drop times between different cassettes and different film-screen combinations be kept to within a range of 2-4 seconds. In practice, it has been found that in side opening cassettes of the type used in the daylight system described, the x-ray film develops a tendency to adhere to one or the other of the intensifying screens even after the holding pressure is relieved therefrom. Numerous methods have been implemented in an effort to overcome this problem. For instance, cantilevered conical actuators have been placed along the cassette edges actuated by a cam assembly which pivots inwardly of the cassette to thereby edgewise engage the film sheet and buckle it to create a gap between the sheet and a screen. The air leakage into the gap tends to equalize the pressure forces on both sides of the sheet to permit it to respond to the influence of gravity and drop from the cassette.

Additionally, it has been found that bending the intensifying screen edges or at least a portion of the intensifying screen edges in a direction away from the film plane further assists removal of the film sheet from the cassette. Such a system is described in pending U.S. application Ser. No. 668,880, filed Nov. 7, 1984. While both of the aforementioned developments have reduced the drop time of film sheets from x-ray daylight type cassettes, as the intensifying screens become smoother in an effort to obtain higher resolution, there is need to improve the reliability of the drop time of film sheets as well as to assure that the variability in these drop times is maintained to within 2 to 4 seconds. There is need for further improvement of the cassettes to obtain consistently short drop times.

SUMMARY OF THE INVENTION

The instant invention is an improvement to an x-ray cassette having a frame with inner and outer sides, a pair of plates mounted on the frame and adapted to receive a film-sheet therebetween, with at least one of the plates being moveable. The cassette defines an opening along a first side of the frame for inserting and removing a film sheet relative to the plates. The improvement comprises a weight positioned within the cassette and moveably secured to a second side of the frame opposite the first side adapted to engage a film sheet and under the influence of gravity to apply a force on the film in a direction to assist its departure from the cassette through the first side opening.

The weight may be moveable between a first and a second position relative to the first side opening, the first position being closer to the first side opening than the second position. The weight may be slideably positioned in the second frame side, or it may be pivotally mounted on the second frame side. At least one intensifying screen secured over one of the plates is included in the cassette, and the second position is defined by an edge of the intensifying screen. A cutout portion along the edge of the intensifying screen extending about 1/16 inch (1.6 mm) from the edge of the screen to the interior of the screen permits the weight to displace the film relative to the screen. The weight is at least 10 grams, and preferably 20 grams.

With this arrangement, the drop time of a film from the cassette when the plates are released is shortened and more reliable.

BRIEF DESCRIPTION OF THE DRAWINGS

The invention may be more fully understood from the following detailed description thereof taken in connection with the accompanying drawings which form a part of this application and in which:

FIG. 3 is a fragmentary representation showing the details of one embodiment of the present invention in which the weight is slideably positioned, FIG. 3A is a cross-sectional view taken along the section line 3A—3A of FIG. 3, and FIG. 4 is a fragmentary representation of an alternate embodiment of the present invention showing a pivotably mounted weight.

DETAILED DESCRIPTION OF THE INVENTION

Figure 1:
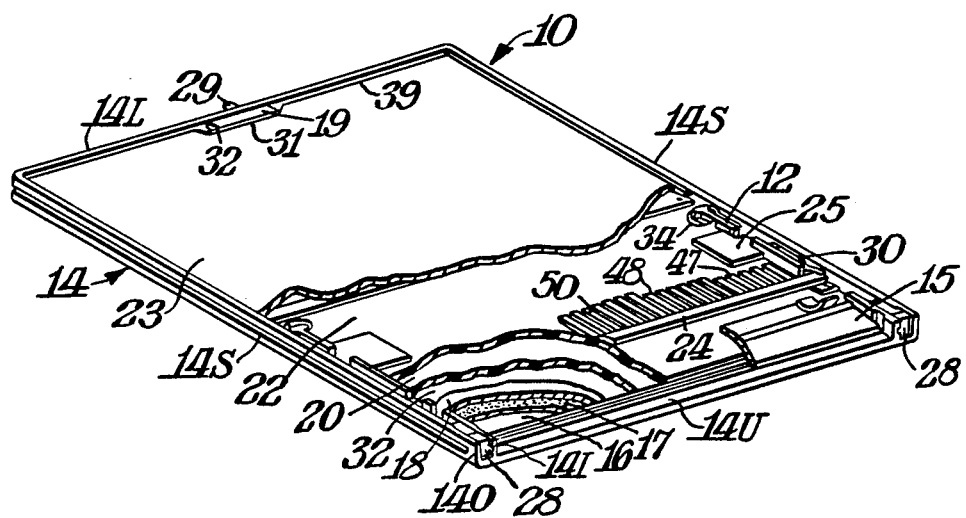
FIG. 1 is a perspective drawing partially cut away showing the structure of an x-ray cassette constructed in accordance with the present invention.

Throughout the following detailed description, similar reference numerals refer to similar elements in all Figures of the drawings. With reference to FIG. 1 there is shown a perspective view of an x-ray cassette, generally indicated by reference character 10, with which a buckler assembly 12 is utilized. The cassette 10 is formed of a rectangular frame 14 having opposed sides 14S and front or entrance and back sides 14U and 14L, respectively. The entrance side 14U includes a slot through which a film sheet may be inserted or retrieved from the cassette. A light gate 15 covers the slot when the cassette is closed. An opaque but x-ray transparent front or window plate 16 is mounted on the frame 14. The window plate 16 is fixedly mounted to the rectangular frame 14. The window plate 16 may be fabricated from magnesium sheet although any suitable material meeting the above specifications, such as aluminum or a synthetic plate comprising an epoxy binder reinforced with a fibrous material such as carbon fibers or Kevlar ® aramid fibers may be employed. Disposed above the window plate 16 is a foam pad 17 and an x-ray intensifying screen 18. A second x-ray intensifying screen 20 is mounted on a backing plate 22 which is movably disposed within the frame 14. A rear plate 23 also mounted on the frame 14 completes the cassette 10. The plates 22 and 23 may be fabricated of aluminum or any other suitable material.

The sides 14S of the frame 14 define a channel having inner and outer rails 14I and 14O, respectively. An appropriate number of leaf spring biasing elements 47, 48, 50, to be described in more detail below, are pivotably mounted on the inner rail 14I of the channel sides 14S and extend transversely across the width of the frame 14. The leaf spring biasing elements act to support the backing plate 22 and bias it toward the window plate 16. Reinforcing tabs 25 may be provided in larger size cassettes to reinforce the backing plate 22.

A cam rail assembly 28 is slideably received within each of the channels. First and second cam surfaces 30 and 36 are secured to the cam rail assembly 28. Cam surfaces 30 on the cam rail assembly 28 engage and actuate the leaf spring biasing elements to alternately release or urge the moveable backing plate 22 against the window plate 16. The cam rail assembly is actuated by external pins (not shown) to move along the frame channels.

With the cam rail assembly 28 in a first position, the biasing force imposed by the leaf spring biasing elements on the backing plate is released defining a space between the backing and the window plates, 22, 16 sufficient to allow an x-ray film sheet 32 to be introduced between the two intensifying screens. With the cam rail assembly 28 in a second position, the leaf spring biasing elements urge backing plate 22 towards the window plate 16 to provide intimate contact between the two intensifying screens 18 and 20 and the film sheet 32 sandwiched therebetween.

Figure 2:
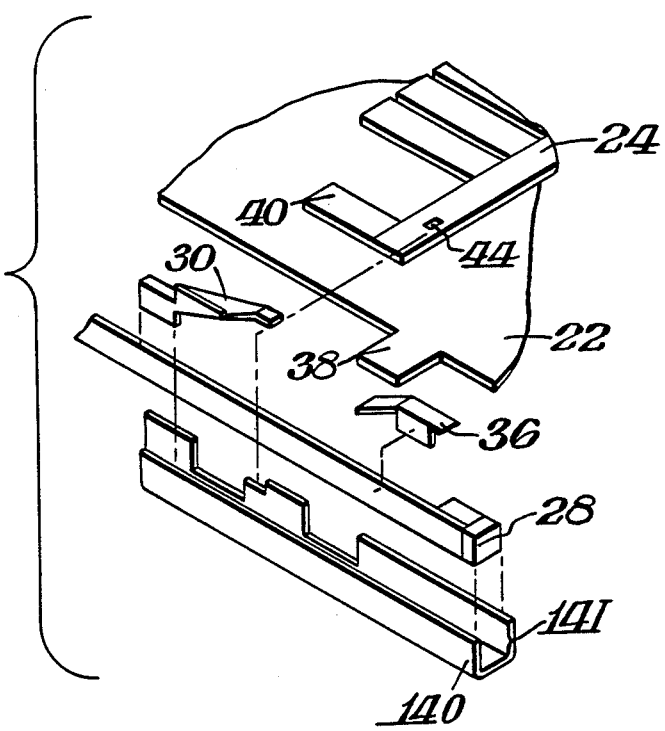
FIG. 2 is an exploded view of the details of the bias cams used to open the cassette plates for permitting movement of a film sheet into or out of the side opening of the cassette.

The second cam surface 36 secured to the cam rail assembly 28 also is seen in FIG. 2. Backing plate 22 includes a tab 38 which extends into the channel between inner rail 14I and outer rail 14O through an opening on the side 14I of this channel. Tab 38, which may form part of reinforcing tab 25, rides on cam surface 36 urging backing plate away from window plate 16 to open up the space between the intensifying screens. Thus, when actuated by movement of the cam rail assembly 28, the leaf spring biasing elements together with cam surfaces 30 and 36 and tab 38 of backing plate 22 cooperate to alternately contact or release the two intensifying screens 18 and 20 and a film sheet 32 placed therebetween.

The intensifying screens 18 and 20 and the backing plate 22 are provided with notches or cutouts 34 at predetermined locations thereon to facilitate the intrusion of buckler 12 into the film areas. A buckler assembly 12 of the type disclosed in DeFelice and LeRoux U.S. Pat. No. 4,383,330 is mounted along the sides 14S of the cassette. Bucklers 12 are pivotably mounted on the sides 14S and operatively connected to the cam rail assembly 28. As the cam rail assembly 28 moves from the second position to the first position, a cam surface on the cam rail engages a portion of buckler 12 forcing buckler 12 to extend into cutout 34 and engage the edge of the film sheet contained in the cassette. As a result of this engagement, the film sheet is buckled and thereby separated or moved away from the intensifying screen to allow air to seep in the space between the film sheet and the intensifying screen. This speeds the release of the film sheet and reduces the drop out time of the film sheet from the cassette. Biasing means not shown, keep the buckler member away from the film sheet when the cam rail assembly 28 is in either the first or the second position. Four bucklers as described by DeFelice et al. are preferably used to assure reliability of operation.

The biasing elements 47, 48 and 50 (FIG. 1) each comprise at least one strap 24 having actuating levers 40 at either end. The strap 24 has openings 44 adapted to engage tabs 44' formed on the inner rail 14I of the channel. In this manner, the cam 30 can engage the actuating lever 40. The leaf spring elements extending in the plane of the strap are preferably progressively longer and thicker in cross-section as one moves from the edges of the cassette towards its center.

In the preferred embodiment, for a cassette of 14×17 inch (35.56×43.18 cm) dimensions, a biasing element having three different size leaf springs is employed. The leaf springs begin at approximately one inch (2.54 cm) from the end of strap 24. The first set of five leaf springs 47 are 1.53 inches (3.89 cm) long and have a thickness of 0.006 inch (0.152 mm). The distance between each leaf spring is 0.03 inch (0.76 mm). A second set of six leaf springs 48 is adjacent to the first set. The second series of leaf springs are 2.0 inches (5.08 cm) long and 0.009 inch (0.229 mm) thick. A third set of six leaf springs 50, each 2.25 inches (5.72 cm) long and 0.012 inch (0.305 mm) in thickness is used reaching the mid-point of the strap. The pattern is then inversely repeated to the end of the strap, the 2.25 inch (5.72 cm) leaf springs followed by the 2.0 inch (5.08 cm) leaf springs followed by the 1.53 inch (3.89 cm) leaf springs terminating 1 inch (2.54 cm) from the other end of the strap 24.

When an arrangement such as the one described above is used, the force applied onto the backing plate 22 varies along the plate. It is largest in the center portion of the plate as compared to the edges. Thus, as the cam rail assembly s actuated, cam surface 30 engages lever arm 40 and a larger force is applied in the center of backing plate 22 preferentially urging the center towards window plate 16. Thus, the center tends to bow towards window plate 16 and contact is believed to be first established near the center of the plate pushing air away from the center towards the extremities. This is similar to the effect of having a bowed plate as is common in the book type cassettes which prevents air entrapment and results in better contact between the screens and the film.

In one embodiment, not shown in the illustrations for the sake of clarity, but described in detail in pending U.S. application Ser. No. 668,880, filed Nov. 7, 1984, the contents of which are incorporated herein by reference, a portion of the screen 18 is bent along its edge contiguous the bucklers 12 in a direction away from film sheet 32 and toward the window plate 16. The portion of the screen bent towards window plate 16 preferably extends the full length of the sides of the screen adjacent one or both channels 14S. The bent angle which is defined as the acute angle between the planes of the screen 18 and the bent edges, being between about 15° and 40°, a preferred range between about 20° and 30°. The bent portion of the screen 18 may be formed by compressing the foam pad 17 or the edge of the pad 17 may be tapered or otherwise shaped to fit under the screen. In determining the width of the bent portion of the inner portion of the screen, the maximum combination of angle and length is such that the underside edge of the screen 18 contacts the surface plate 16. In practical terms this is about 1/16 to ⅛ of an inch (1.588 to 3.175 mm) for an x-ray cassette capable of handling 14×17 inches (35.5×43.18 cm) film sheets. The typical foam pad thickness is about 0.1 inch (0.254 cm).

The bent portion of screen 18 may extend only partially along the edge adjacent a channel 14S; so long as one buckler is operating in the cut out along the bent portion, quick release of the film is obtained. It is also desirable that the foam pad 17 be secured along its full surface on back plate 16 and held firmly thereto.

Preferably, the screen 20 is mounted on the moveable plate 22 using a layer of adhesive that does not cover the full back surface of the screen. The screen is attached to the back plate leaving three 18 mm wide strips extending along side rails 14S and 14L, as explained in more details in the aforementioned pending U.S. application Ser. No. 668,880.

Referring now to FIGS. 3 and 3A, there is shown in greater detail a preferred embodiment of the present invention. The lower sides 14L of the rectangular frame comprises a channel having a rectangular cross-section (FIG. 3A). The rail of the channel facing inwardly of the cassette is indicated by 13 while the rail of the channel facing outwardly is indicated by 13'. Along the rail 13 there is a slight cutout portion sized to fit the long dimension of a generally rectangularly shaped weight 19. This weight, which weighs at least 10 grams and preferably about 20 grams, is mounted on rail 13 through the use of 2 pins, pin 21, which is fitted into a hole 26 in rail 13, and pin 29, which is longer, is fitted through holes 27 in rail 13 and 27' in rail 13', extends through the side 14L of the frame to the outside of the cassette. The top limit to the weight 19 is determined by the physical space available within the cassette. Obviously too large a weight will bend the film sheet. There is little reason to use weights of more than 30 grams, with 20 grams being preferred as noted. The pin 29 serves the dual purpose of supporting and guiding the movement of the weight 19 as well as indicating the presence of a film sheet in the cassette.

Film indication is achieved when a film sheet 32 is loaded into a cassette. This typically is accomplished when the cassette is positioned with the entrance slot up, i.e., with the opening 31 above the weight 19, under a film dispenser and the film sheet dropped in. The weight 19 drops because of gravity aided by the dropping film sheets impacting the weight 19. This causes the pin 29 to extend and indicate the presence of a film sheet. When pin 29 is in the extended position, an operator may readily know, simply by observation, that a film is in the cassette.

Opposite the weight 19, the intensifying screens 18 and 20 have a small cutout portion 31 along their edge 39. In the absence of a film sheet 32, this cutout portion, generally indicated by the number 31, allows the weight to penetrate the screens a short distance "d" which is of the order of 1/16 inches (0.16 cm) in the plane of the intensifying screens. A film sheet 32 placed and held between the screens 18 and 20 prevents the weight from entering into that cutout portion 31.

The weight 19 may slide along the direction of arrow 35 supported on the frame sides rails 13 and 13' by pins 21 and 29. When the cassette is placed in an orientation such that the film opening 31 is below the weight 19, as would be the case when one attempts to extract a film from the cassette using gravity, the weight 19 rests against the upper edge of a film sheet 32 held between the two intensifying screens 18 and 20. In the automatic unloading apparatus which is employed with the cassettes of the present type, two pins actuate the biasing means which hold the two intensifying screens firmly against each other to release and separate them. When the intensifying screens are separated, gravity pushes the weight against the film sheet 32 applying a force depicted by arrow 33 in FIG. 3, which tends to urge the film sheet downwardly and out of the cassette. Surprisingly, even though the weight pushes in a generally vertical direction on the film and one would expect that the film would scrape against the screen and develop artifacts including static discharge marks thereon, no such marks have been detected. When weights of the order of 10 grams are used with a 14×17 inch (35.56×43.18 cm) film sheet, in a cassette of the type disclosed herein, drop times of the order of 0.2 to 3.1 seconds have been observed, depending on the orientation of the film placed between the two screens. In the absence of a weight, when a similar experiment was run, drop times appeared to vary between 3.8 to 7.6 seconds.

FIG. 4 shows an alternate embodiment of this invention in which a pivotably mounted weight 19' is shown. This weight is supported through a pivot 37 on the lower side 14L of the cassette. A cutout portion 41 on the inner rail 13 of side 14L allows the weight 19 to swing and apply a force in the direction of the arrow 33 on the film sheet 32 held between the intensifying screens 18 and 20. A cutout portion 31 is again provided along edge 39 of the intensifying screens. A film presence indicator pin 29' is supplied to serve the same purpose as in the embodiment of FIG. 3. It may have a flange at the lower end (in the drawing), which is not shown, to limit the pins motion.

Those having the benefit of the teachings of this invention will consider alternate modifications in the mounting mechanism of the weights and in the application of a force directed in the direction of arrow 33 to assist in releasing a film sheet similarly held in an x-ray device. Such modifications are within the scope of the present invention as described in the specification and the appended claims in which:

We claim:

1. In an X-ray cassette having a frame with inner and outer sides, a pair of plates mounted on the frame oriented to receive a film sheet therebetween, at least one of the plates being moveable.

the cassette defining an opening along a first side of the frame for inserting and removing a film sheet relative to the plates, the improvement comprising:

a mass of at least 10 grams positioned within the cassette and movably secured to a second side of the frame opposite the first side, the mass being moveable from a second position away from a film sheet in the cassette to a first position closer to the first side opening to engage such a film sheet and under the influence of gravity to apply a force on such a film sheet in a direction to assist its departure from the cassette through the first side opening when said side opening is facing downwardly.

2. A cassette according to claim 1 in which the mass is slideably positioned on the second frame side.

3. A cassette according to claim 2 in which the mass is pivotally mounted on the second frame side.

4. A cassette according to claim 2 in which the cassette includes at least one intensifying screen secured over one of the plates and wherein the second position is defined by an edge of the intensifying screen.

5. A cassette according to claim 4 wherein the intensifying screen defines a cutout position for receiving the weight, so as to permit the mass to engage a film sheet and while so engaged to displace such film sheet relative to the screen.

6. A cassette according to claim 6 wherein the cutout position extends about 1/16 inch (0.16 cm) from the edge of the screen to the interior of the screen.

7. A cassette according to claim 6 wherein the mass is about 20 grams and rectangular in shape.

8. A cassette according to claim 6 wherein the mass lies in the range of 10 to 15 grams.

9. A cassette according to claim 1 in which one of said plates is non-moving and the cassette includes at least one intensifying screen secured over the non-moving plate, the intensifying screen having at least a portion of at least one of its edges bent away from the moveable plate.

10. A cassette according to claim 1 in which one of said plates is fixed and said cassette includes a buckler element mounted on the frame along one edge of the fixed plate operative to engage an edge of a film sheet to buckle the same away from at least one of the plates.

* * * * *